(12) United States Patent
Liu et al.

(10) Patent No.: US 7,924,655 B2
(45) Date of Patent: Apr. 12, 2011

(54) ENERGY-BASED SOUND SOURCE LOCALIZATION AND GAIN NORMALIZATION

(75) Inventors: Zicheng Liu, Bellevue, WA (US); Zhengyou Zhang, Bellevue, WA (US); Li-wei He, Redmond, WA (US); Philip A. Chou, Redmond, WA (US); Minghua Chen, Redmond, WA (US)

(73) Assignee: Microsoft Corp., Redmond, WA (US)

( * ) Notice: Subject to any disclaimer, the term of this patent is extended or adjusted under 35 U.S.C. 154(b) by 1122 days.

(21) Appl. No.: 11/623,643

(22) Filed: Jan. 16, 2007

(65) Prior Publication Data

US 2008/0170717 A1 Jul. 17, 2008

(51) Int. Cl.
*H04R 5/02* (2006.01)
(52) U.S. Cl. .................................................. 367/124
(58) Field of Classification Search .................. 367/124, 367/129, 118
See application file for complete search history.

(56) References Cited

U.S. PATENT DOCUMENTS

| | | |
|---|---|---|
| 6,970,796 B2 | 11/2005 | Tashev |
| 7,039,199 B2 | 5/2006 | Rui |
| 7,127,071 B2 | 10/2006 | Rui |
| 2004/0001137 A1 | 1/2004 | Cutler |
| 2004/0170289 A1 | 9/2004 | Whan |
| 2005/0195988 A1 | 9/2005 | Tashev |
| 2005/0262201 A1 | 11/2005 | Rudolph |
| 2006/0256983 A1 | 11/2006 | Kenoyer |
| 2008/0170717 A1* | 7/2008 | Liu et al. .................. 381/92 |

FOREIGN PATENT DOCUMENTS

WO    WO 2008/089290    *    7/2008

OTHER PUBLICATIONS

Duy Nguyen, Parham Aarabi, Ali Sheikholeslami, "Real-Time Sound Localization using Field-Programmable Gate Arrays".
Jean-Marc Valin, Francois Michaud, Jean Rouat, Dominic L'etourneau; "Robust Sound Source Localization Using a Microphone Array on a Mobile Robot".
Parham Aarabi, "The Fusion of Distributed Microphone Arrays for Sound Localization"EURASIP Journal on Applied Signal Processing 2003:4, 338-347, 2003 Hindawi Publishing Corp.
"http : www.polycom.com/products_services,".
R. Cutler, Y. Rui, A. Gupta, J. Cadiz, I. Tavesh, L. He, A. Colburn, Z. Zhang, Z. Liu, S. Silverberg; "Distributed Meetings . . . "; ACM Multi-Media 2002. 2002.
M. Brandstein and H. Silverman, "A practical methodology for speech localization with microphone arrays," in , Computer, Speech, and Language, 11(2):91-126, Apr. 1997.
R. Lienhart, I. Kozintsev, S. Wehr, and M. Yeung, "On the importance of exact synchronization for distributed audio processing," in IEEE ICASSP 2003, 2003.

(Continued)

*Primary Examiner* — Dan Pihulic
(74) *Attorney, Agent, or Firm* — Lyon & Harr, LLP; Katrina A. Lyon

(57) ABSTRACT

An energy based technique to estimate the positions of people speaking from an ad hoc network of microphones. The present technique does not require accurate synchronization of the microphones. In addition, a technique to normalize the gains of the microphones based on people's speech is presented, which allows aggregation of various audio channels from the ad hoc microphone network into a single stream for audio conferencing. The technique is invariant of the speaker's volumes thus making the system easy to deploy in practice.

20 Claims, 10 Drawing Sheets

OTHER PUBLICATIONS

V. C. Raykar, I. Kozintsev, and R. Lienhart, "Position calibration of microphones . . . ," IEEE Transactions on Speech and Audio Processing, vol. 13, No. 1, pp. 70-83, Jan. 2005.

C. Zhang, P. Yin, Y. Rui, R. Cutler, and P. Viola, "Boosting-based multimodal speaker detection . . . ," in IEEE International Workshop on Multimedia Signal Processing 2006.

* cited by examiner

ENERGY-BASED SOUND SOURCE LOCALIZATION AND GAIN NORMALIZATION

BACKGROUND

Typical audio conferencing systems use an array of microphones that are fixed in location relative to each other and are synchronized in order to capture the audio of a meeting. In this configuration, sound source localization (SSL) techniques can readily be used to determine the location of a person speaking. Once the sound source is localized, beam-forming can be used to output higher quality audio than if a single microphone was used. Additionally, if a camera is associated with the microphone array, the speaker's video can be displayed in conjunction with the captured audio.

Often, however, the locations of microphones in a meeting room are not fixed or known. For example, meeting participants bring laptops or other computing devices with built-in microphones to a meeting. These laptops or other computing devices are usually wireless network enabled, so they can form an ad hoc network. Compared to traditional microphone array devices, these ad hoc microphone arrays are spatially distributed and the microphones in general are closer to the meeting participants. Thus, higher audio quality can be expected in capturing audio from a speaker (e.g., a person talking), assuming that the microphones used in the mobile computing devices and those in the fixed array devices have the same quality. On the other hand, microphones in an ad hoc arrangement present many challenges. For example, these microphones are not synchronized and the location of these microphones and associated computing devices such as laptop computers is unknown. Additionally, the microphones have different and unknown gains, and their quality is different (i.e., they have different signal to noise ratios). These factors present a problem in capturing a high quality audio recording of a meeting.

SUMMARY

The present energy-based sound source localization and gain normalization technique for ad hoc microphones is an energy-based technique for locating speakers (e.g. people talking) when microphones are positioned in an ad hoc manner. This technique does not require accurate time synchronization. In fact, the present energy-based sound source localization and gain normalization technique only uses the average energy of the meeting participants' speech signals to obtain a position estimate of a person speaking.

Given that the microphones in associated computing devices configured in an ad hoc network are spatially distributed, a person speaking in a room is usually relatively close to one of the microphones. Therefore, the present energy-based sound source localization technique selects the signal from the microphone that is closest to the speaker (the signal that has the best signal to noise ratio (SNR)) when determining the locations of the microphones and the people speaking in the room. The present energy-based sound source localization and gain normalization technique estimates the relative gains of the microphones using meeting participants' speech signals. In general, one embodiment of the present energy-based sound source localization and gain normalization technique first computes the speakers' and microphone positions as well as the gain of the microphones, assuming that every person speaking has a computing device with a microphone. Then the technique is used to determine the position of people speaking that do not have their own associated computing device. The coordinates of the microphones/people and the gain of each microphone can then be used to improve the audio or video of the meeting. Purposes may include, for example, beam-forming to improve the quality of the audio, sound source localization in order to locate the speaker and display associated video or contact information, and aggregating various audio channels from the ad hoc microphone network into a single gain normalized stream for audio conferencing.

It is noted that while the foregoing limitations in existing sound source localization schemes described in the Background section can be resolved by a particular implementation of the present energy-based sound source localization and gain normalization technique, this is in no way limited to implementations that just solve any or all of the noted disadvantages. Rather, the present technique has a much wider application as will become evident from the descriptions to follow.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In the following description of embodiments of the present disclosure reference is made to the accompanying drawings which form a part hereof, and in which are shown, by way of illustration, specific embodiments in which the technique may be practiced. It is understood that other embodiments may be utilized and structural changes may be made without departing from the scope of the present disclosure.

DESCRIPTION OF THE DRAWINGS

The specific features, aspects, and advantages of the disclosure will become better understood with regard to the following description, appended claims, and accompanying drawings where:

DETAILED DESCRIPTION

1.0 The Computing Environment

Before providing a description of embodiments of the present energy-based sound source localization and gain normalization technique, a brief, general description of a suitable computing environment in which portions thereof may be implemented will be described. The present technique is operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1:
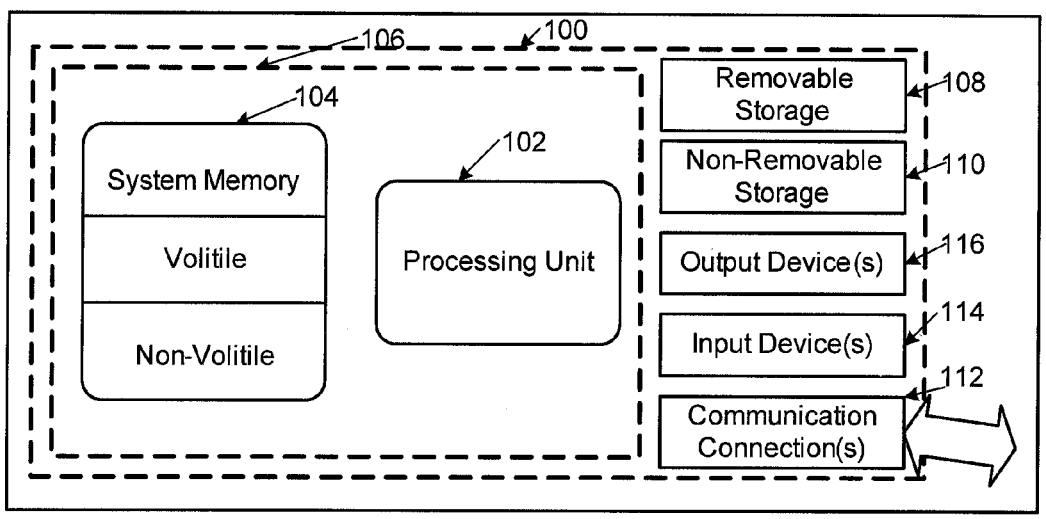
FIG. 1 is a diagram depicting a general purpose computing device constituting an exemplary system for a implementing a component of the present energy-based sound source localization and gain normalization technique.

FIG. 1 illustrates an example of a suitable computing system environment. The computing system environment is only one example of a suitable computing environment and is not intended to suggest any limitation as to the scope of use or functionality of the present sound source localization technique. Neither should the computing environment be interpreted as having any dependency or requirement relating to any one or combination of components illustrated in the exemplary operating environment. With reference to FIG. 1, an exemplary system for implementing the present energy-based sound source localization and gain normalization technique includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 has a microphone and may also have other input device(s) 114 such as keyboard, mouse, pen, voice input device, touch input device, and so on. Output device(s) 116 such as a display, speakers, a printer, and so on may also be included. All of these devices are well known in the art and need not be discussed at length here.

Device 100 can include a camera as an input device 114 (such as a digital/electronic still or video camera, or film/photographic scanner), which is capable of capturing a sequence of images, as an input device. Further, multiple cameras could be included as input devices. The images from the one or more cameras can be input into the device 100 via an appropriate interface (not shown). However, it is noted that image data can also be input into the device 100 from any computer-readable media as well, without requiring the use of a camera.

The present energy-based sound source localization and gain normalization technique may be described in the general context of computer-executable instructions, such as program modules, being executed by a computing device. Generally, program modules include routines, programs, objects, components, data structures, and so on, that perform particular tasks or implement particular abstract data types. The present energy-based sound source localization and gain normalization technique may also be practiced in distributed computing environments where tasks are performed by remote processing devices that are linked through a communications network. In a distributed computing environment, program modules may be located in both local and remote computer storage media including memory storage devices.

The exemplary operating environment having now been discussed, the remaining parts of this description section will be devoted to a description of the program modules embodying the present sound source localization technique.

2.0 Energy-Based Sound Source Localization and Gain Normalization Technique

The following paragraphs discuss an exemplary operating environment, overviews of exemplary systems and processes employing the energy-based sound source localization and gain normalization technique, and details regarding the various embodiments.

2.1 Exemplary Operating Environment

Figure 2:
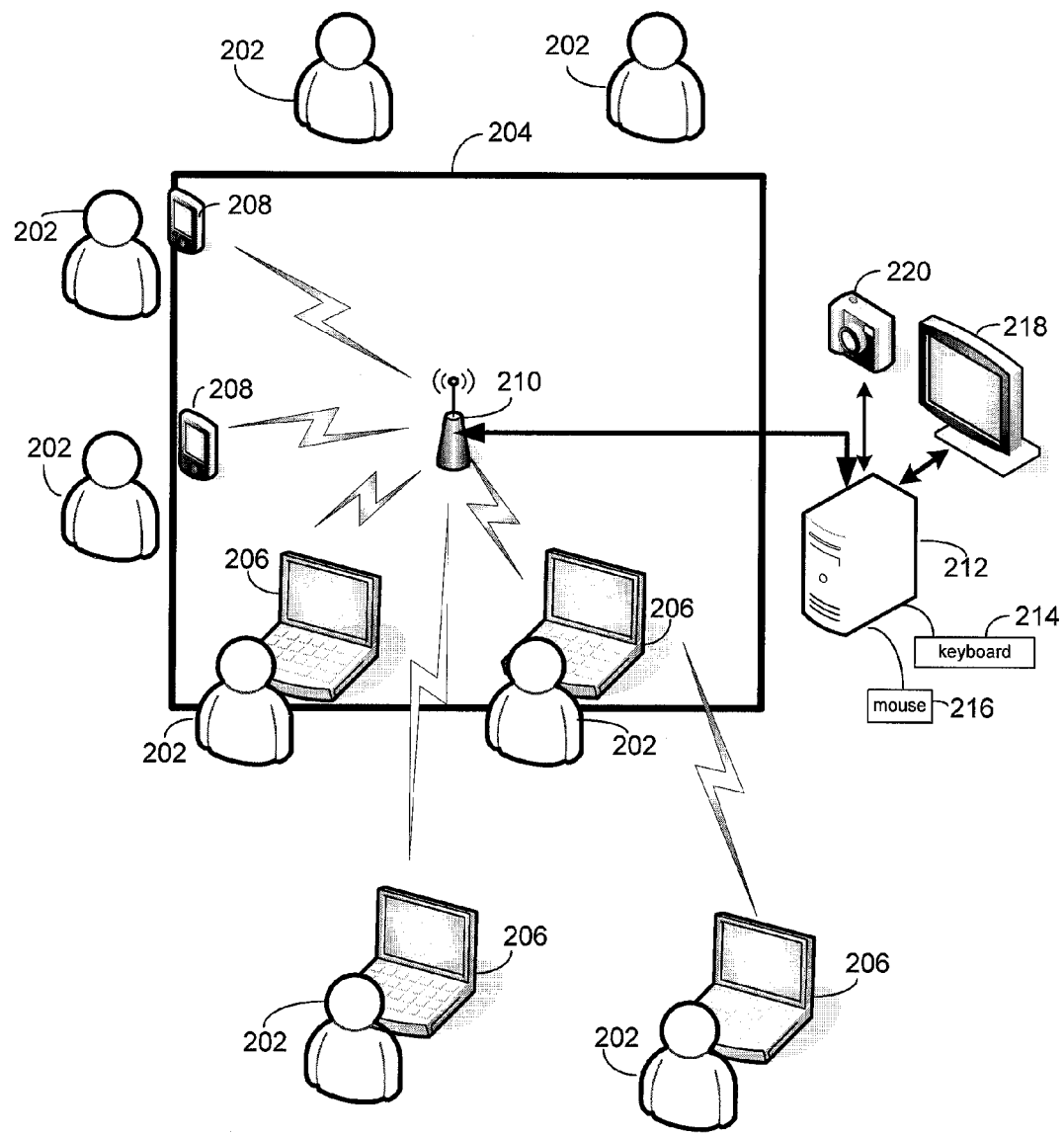
FIG. 2 is a diagram depicting an exemplary environment wherein the present energy-based sound source localization and gain normalization technique could be employed.

FIG. 2 depicts an exemplary environment in which the present energy-based sound source localization and gain normalization technique can be practiced. The present energy-based sound source localization and gain normalization technique is typically used in a meeting room environment. As in a typical meeting, meeting participants 202 can sit around a table 204, or can sit away from the table. Each meeting participant 202 can have a notebook computer 206 or other computing device 208 equipped with a microphone and the capability to link to a wireless network via a wireless access point 210. Alternately the computers can plug into a standard network. Audio streams of each person speaking are captured by the microphones in the laptops or other computing devices 206, 208 and are transferred to a computer 212 for processing. The computer 212 can be controlled by a keyboard 214 or other input device 216 and typically has a display 218. It can also have inputs from a camera 220 and other devices. The computer 212 can also be networked with other computers and can send and receive data to and from these other devices. The energy-based sound source localization and gain normalization technique can compute the location of the microphones in the laptop computer and computing devices, the locations of each person speaking and the gains of the microphones. These parameters can be used in beam-forming to improve the quality of the audio recorded or to locate a speaker and display his image on the display 218, or transmit his image over a network, if associated video is available. Other uses of this data include gain normalization and displaying the speaker's contact information, among others.

2.2 System Overview

Figure 3:
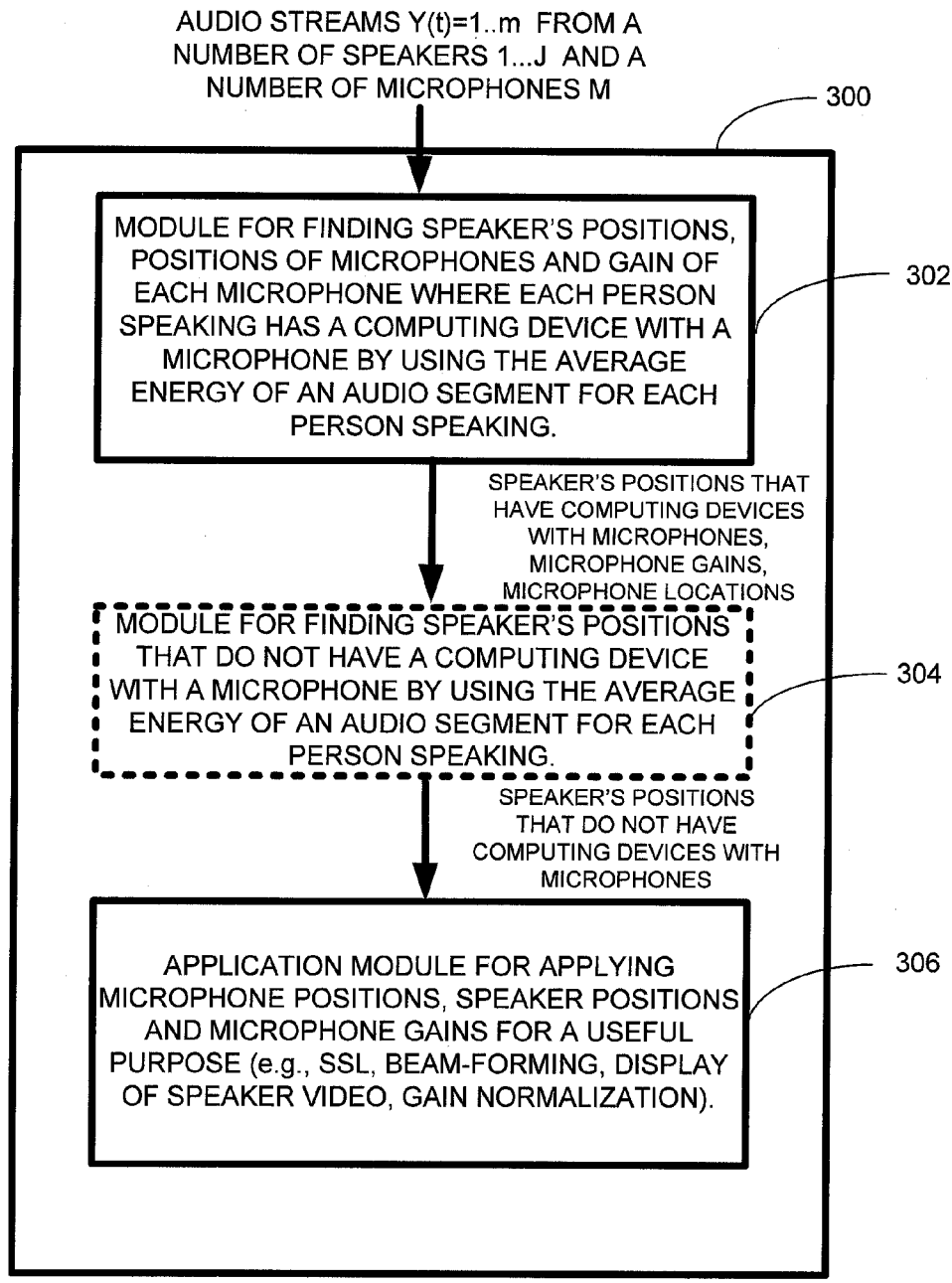
FIG. 3 is a block diagram depicting one embodiment of the architecture of the present energy-based sound source localization and gain normalization technique's architecture.

FIG. 3 provides an overview of one embodiment of the present energy-based sound source localization and gain normalization system 300. The modules shown are typically resident on computer 212. In general, one embodiment of the present energy-based sound source localization and gain normalization technique has a first module 302 that can compute the speakers' and microphone positions as well as the gain of the microphones, assuming that every person speaking has a computing device with a microphone, by using the average energy of an audio segment for each person speaking. The technique can also employ a second module 304 that determines the position of people speaking that do not have their own associated computing device, again employing the average energy for each person speaking. Finally, the coordinates of the microphones, speakers and the gain of one or more of the microphones are then used to improve the audio or video of the meeting by an application module 306. Such applications may include, for example, beam-forming to improve the quality of the audio, sound source localization in order to locate the speaker and display associated video or contact information, and aggregating various audio channels from the ad hoc microphone network into a single gain normalized stream for audio conferencing. It should be noted that modules 302 and 304 can be employed alone, without the other module.

Figure 4:
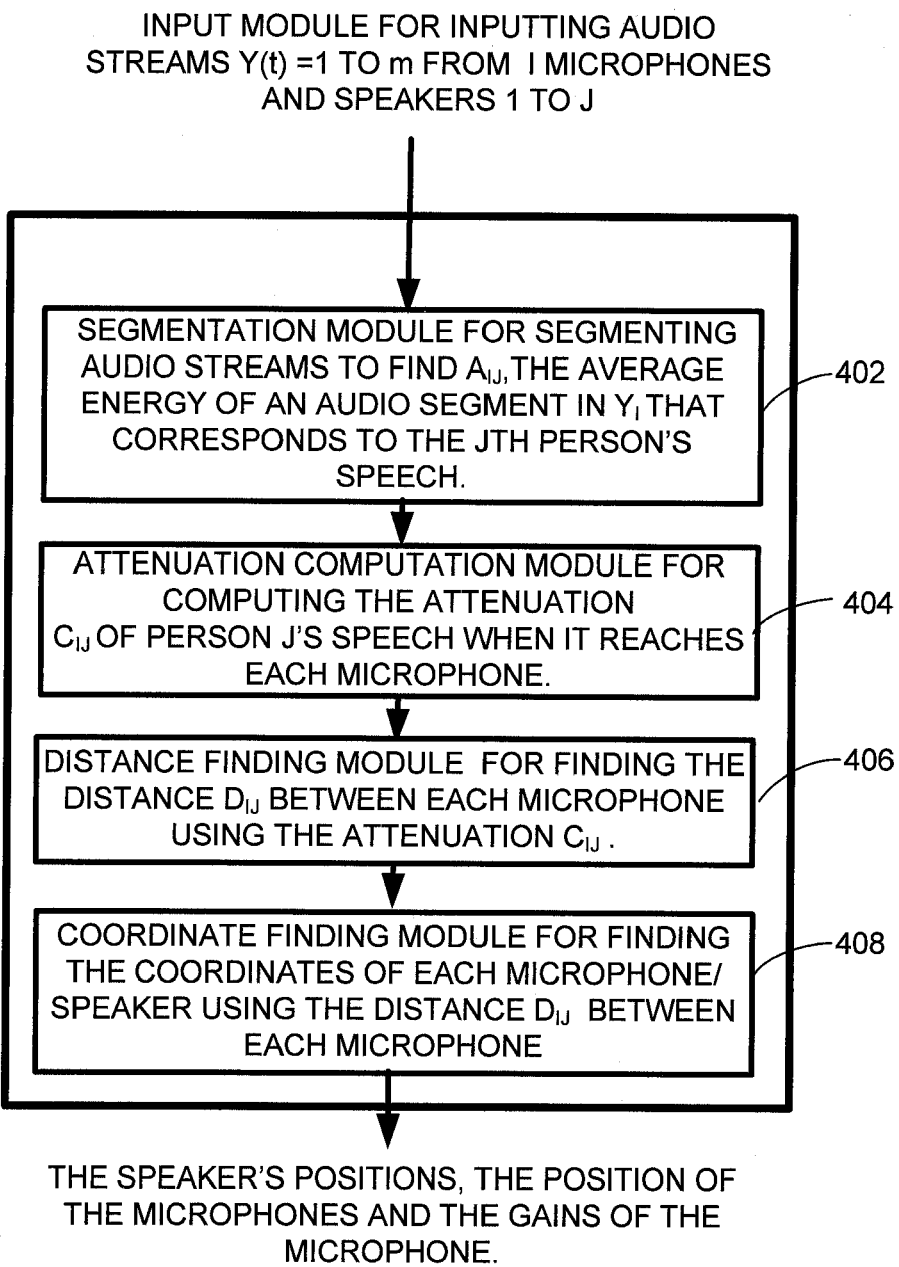
FIG. 4 is a block diagram depicting one embodiment of the architecture of the present energy-based sound source localization and gain normalization technique that determines the location of people speaking that have an associated computing device with a microphone.

More specifically, as shown in FIG. 4, in one exemplary embodiment of the present energy-based sound source localization and gain normalization technique, it is assumed that the location of a person speaking and their computing device with microphone are co-located. Audio streams from all people speaking in the room are input. The system employs a segmentation module 402 to segment the received audio streams from each person in the room to find the average energy of an audio segment for each of the people speaking and to identify which microphone/computing device corresponds to a given person. Another module, the attenuation and gain computation module 404, computes the attenuation of a person's speech when it reaches each of the microphones and can also compute the gain of each of the microphones. A distance determination module 406 uses these attenuations to find the distance between each microphone relative to the other microphones. A coordinate determination module 408 then uses the distances between the microphones to find the coordinates of each microphone, which are also assumed to be the coordinates of the person associated with that microphone/computing device. The coordinates of the microphones/people and the gain of each microphone can then be used by the application module 306 which applies the locations of the microphones, speakers and gains for some purpose.

Figure 5:
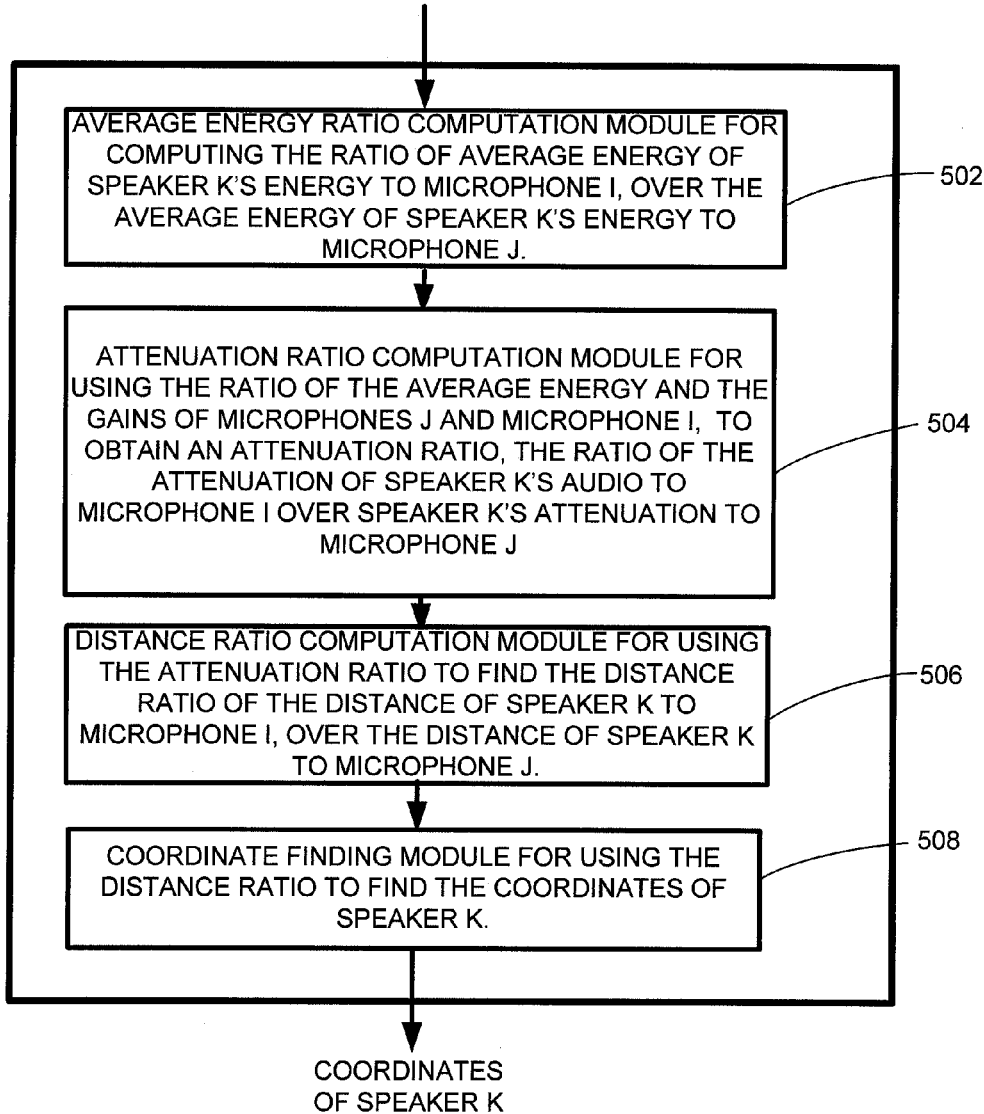
FIG. 5 is a block diagram depicting one embodiment of the present energy-based sound source localization and gain normalization technique that determines the location of people speaking that do not have an associated computing device with a microphone.

The present energy-based sound source localization and gain normalization technique also can compute the location of people speaking that do not have their own computing device with a microphone. In one embodiment, shown in FIG. 5, this is done by employing an average energy ratio computing module 502 that computes the ratio of the average energy of the audio stream of a speaker that is not closest to a microphone to a first microphone over the average energy of the audio stream of the speaker that is not closest to a microphone to a second microphone. This average energy ratio is then input into an attenuation ratio computing module 504 where it is used to compute an attenuation ratio, the ratio of the attenuation of the audio stream of the speaker that is not closest to a microphone to a first microphone over the attenuation of the audio stream of the speaker that is not closest to a microphone to a second microphone. Once the attenuation ratio is found it is input into a distance ratio computation module 506 where it is used to find a distance ratio, the ratio of the distance of the speaker that is not closest to a microphone to a first microphone over the distance of the speaker that is not closest to a microphone to a second microphone. Finally, the distance ratio is used to find the coordinates of the speaker that is not closest to a microphone in a coordinate finding module 508.

Figure 6:
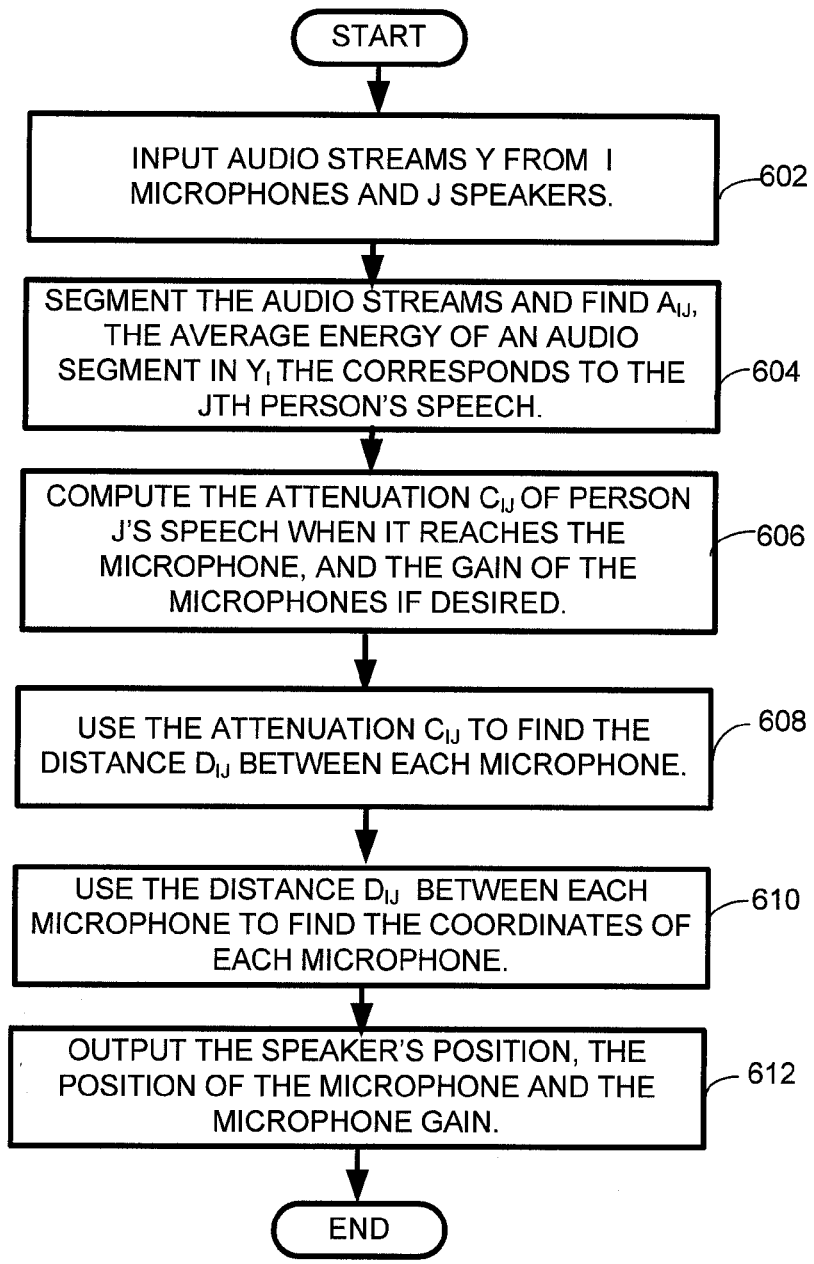
FIG. 6 is a flow diagram depicting one exemplary embodiment of the present energy-based sound source localization and gain normalization technique wherein each speaker has a computing device with a microphone.

2.3 Exemplary Energy-Based Sound Source Localization and Gain Normalization Process FIG. 6 provides a flow diagram of one exemplary embodiment of the present energy-based sound source localization and gain normalization process 600 where each person in the room has a laptop computer or other computing device with a microphone. Audio streams y are input from i microphones and j speakers, as shown in block 602. The audio streams are segmented in order to find the average energy of an audio segment from each microphone i that corresponds to the jth person's speech, as shown in block 604. For all speaker's, the attenuation $C_{ij}$ of person J's speech when it reaches each microphone i, is computed (block 606). Optionally the gain of each microphone can also be computed (block 606). The attenuation $C_{ij}$ is then used to find the distance $D_{ij}$ between each microphone (block 608). The distance $D_{ij}$ between each microphone is then used to find the coordinates of each microphone (block 610).

Figure 7:
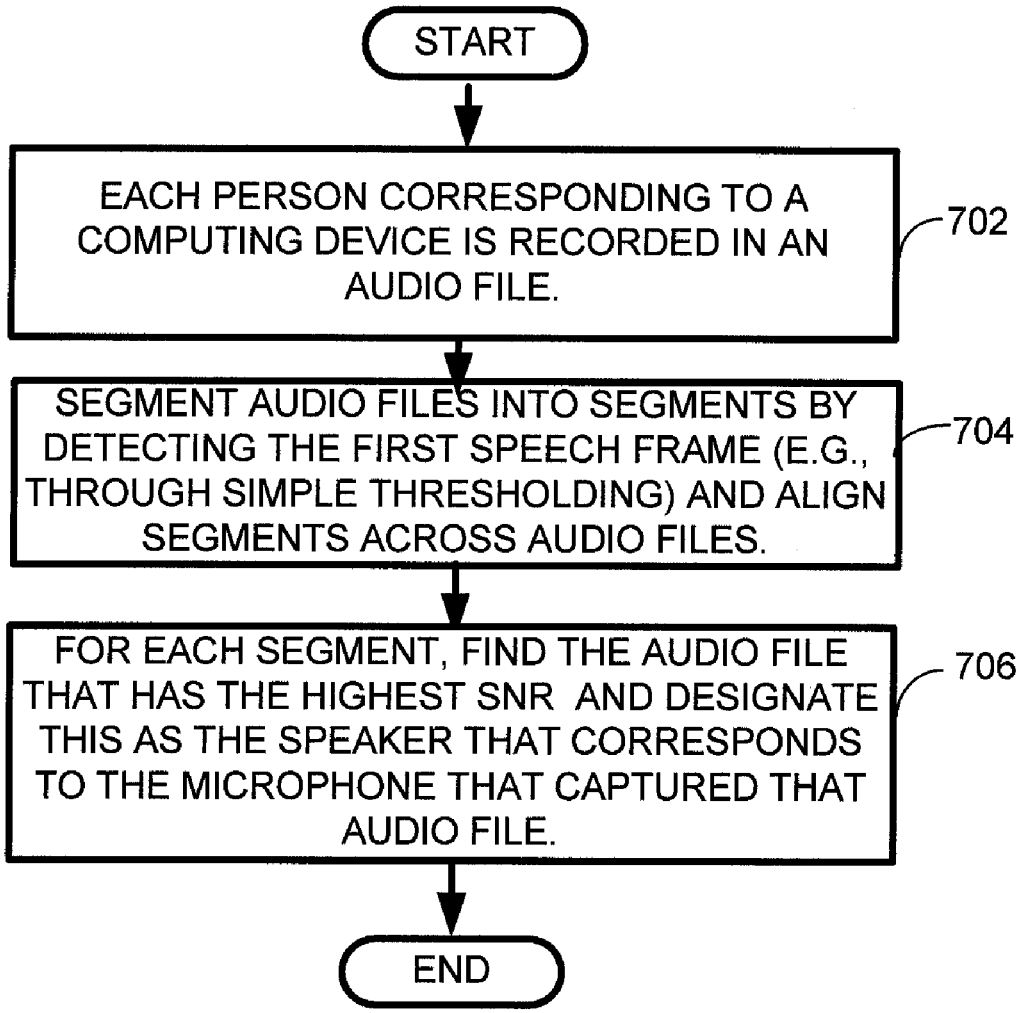
FIG. 7 is a flow diagram depicting one exemplary technique of segmenting the input audio streams to determine which speaker is associated with which microphone.

FIG. 7 provides an exemplary segmentation process that can be employed by the present energy-based sound source localization and gain normalization process. As shown in FIG. 7, block 702, each person speaking corresponding to each computing device is recorded in an audio file. The audio files are divided into segments by detecting the first speech frame through simple thresholding, and the audio segments are aligned across audio files (block 704). Speaker segmentation is performed for each audio segment by finding the audio file that has the highest signal to noise ratio (SNR) (block 706). The speaker of each audio segment is then associated with the microphone that captured the audio file that produces the highest SNR for that segment.

Mathematically the above exemplary embodiment of the present energy-based sound source localization and gain normalization process can be described as follows. As mentioned above, it is assumed that meeting participants are in a room and have their laptops or other computing device in front of them. It is further assumed that each laptop or other computing device has an associated microphone and that the laptops are connected by a network.

It is assumed there are m laptops, and for ease of description, that each person speaks once. Let $y_i(t)$, $i=1,\ldots,m$ denote the audio stream captured by the ith laptop. Let $a_{ij}$ denote the average energy of the audio segment in $y_i(t)$ that corresponds to jth person's speech. Let $s_j$ denote the average energy of jth person's original speech which is unknown and let $c_{ij}$ denote the attenuation of person j's speech when it reaches microphone i. Let $m_i$ denote the gain of the microphone on laptop i. It is possible to model the average energy of the audio segment in $y_i(t)$, $a_{ij}$, that corresponds to the jth person's speech, as the gain of microphone, $m_i$, times j's original speech, $s_j$, times $c_{ij}$, the attenuation of person j's speech when it reaches microphone i, as shown below:

$$a_{ij} = m_i s_j c_{ij} \quad (1)$$

The assumption is made that each speaker and the associated computing device/laptop are at the same location. Thus, $c_{ij}=c_{ji}$, and $c_{ii}=1$.

From equation (1), the ratio of $a_{ij}/a_{ii}$ can be calculated as $$\frac{a_{ij}}{a_{ii}} = \frac{m_i s_j c_{ij}}{m_i s_i} = \frac{s_j c_{ij}}{s_i} \quad (2)$$

and $$\frac{a_{jj}}{a_{ji}} = \frac{m_j s_j}{m_j s_i c_{ji}} = \frac{s_j}{s_i c_{ji}} \quad (3)$$

Multiplying equations (2) and (3), one obtains $$\sqrt{\frac{a_{ij} a_{jj}}{a_{ii} a_{ji}}} = \frac{s_j}{s_i} \quad (4)$$

Substituting equation (4) into (2), one can obtain $c_{ij}$, the attenuation of person j's speech when it reaches microphone i, as $$c_{ij} = \frac{a_{ij}}{a_{ii}} \sqrt{\frac{a_{ii} a_{ji}}{a_{ij} a_{jj}}} = \sqrt{\frac{a_{ij} a_{ji}}{a_{ii} a_{jj}}} \quad (5)$$

Equation (5) has the following properties: it is independent of the gains of the microphone in computing device or laptop i, and it is invariant of the scaling of the speech energy. For example, if $a_{ji}$ and $a_{ii}$ are multiplied by the same value, the right hand side remains the same.

If $d_{ij}$ denotes the Euclidean distance between laptop i and j, clearly the attenuation of person j's speech when it reaches microphone i, $c_{ij}$, is a function of $d_{ij}$. Theoretically speaking, audio energy is inversely proportional to the square of the distance between the sound source and the microphone. However, empirical data taken in several meeting rooms has shown that $d_{ij}$ is approximately a linear function of $1/c_{ij}$. It is believed that there is a linear relationship because of room reverberation, environmental and sensor noises, occlusions, and the relatively small distances between the microphones and people speaking. Based on this observation, one may set the distance between the sound source (the person speaking) and the microphone equal to the inverse of $d_{ij}=1/c_{ij}$, thus obtaining the distance between each pair of microphones. Metric Multidimensional Scaling (MDS) may then be used to obtain the 2D coordinates for each microphone.

Figure 8:
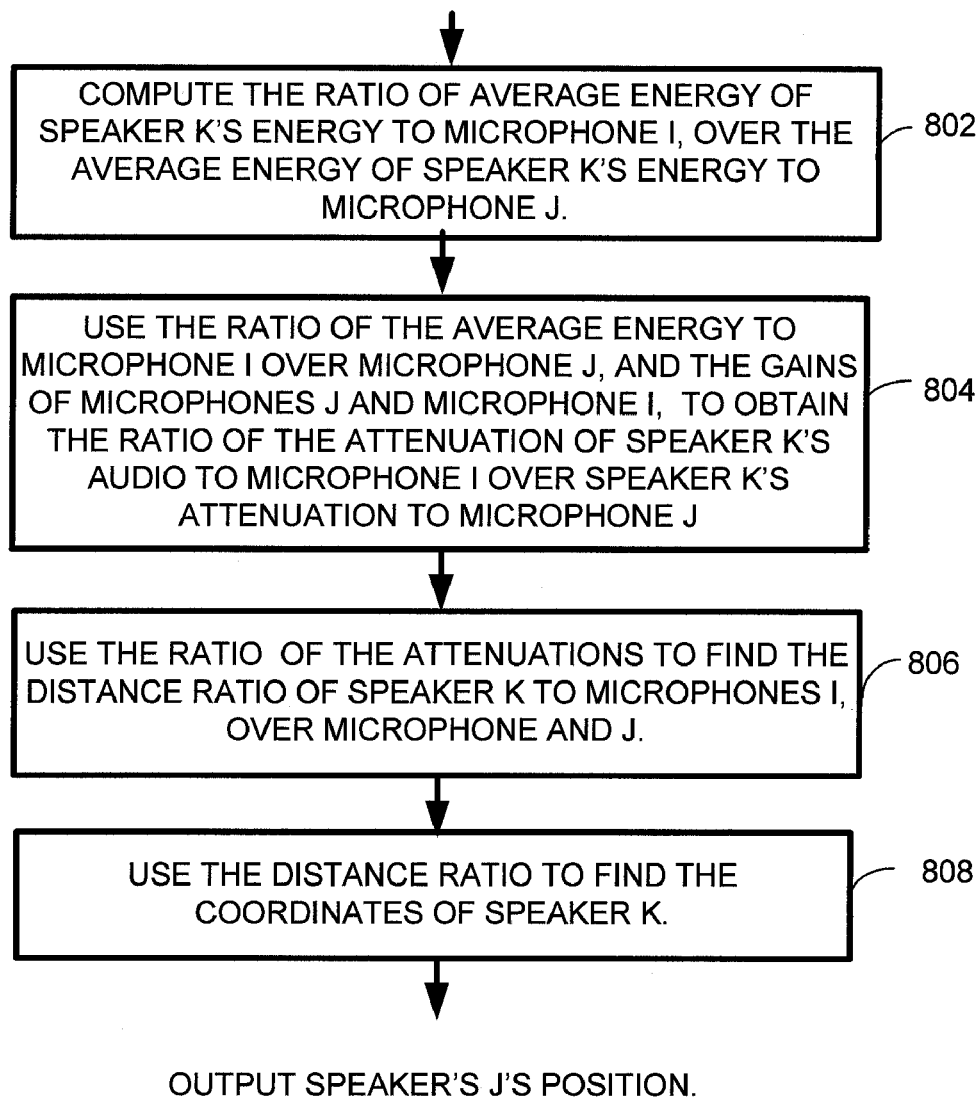
FIG. 8 is a flow diagram depicting one exemplary embodiment of the present sound source localization technique wherein each speaker does not have a computing device with a microphone.
Figure 9:
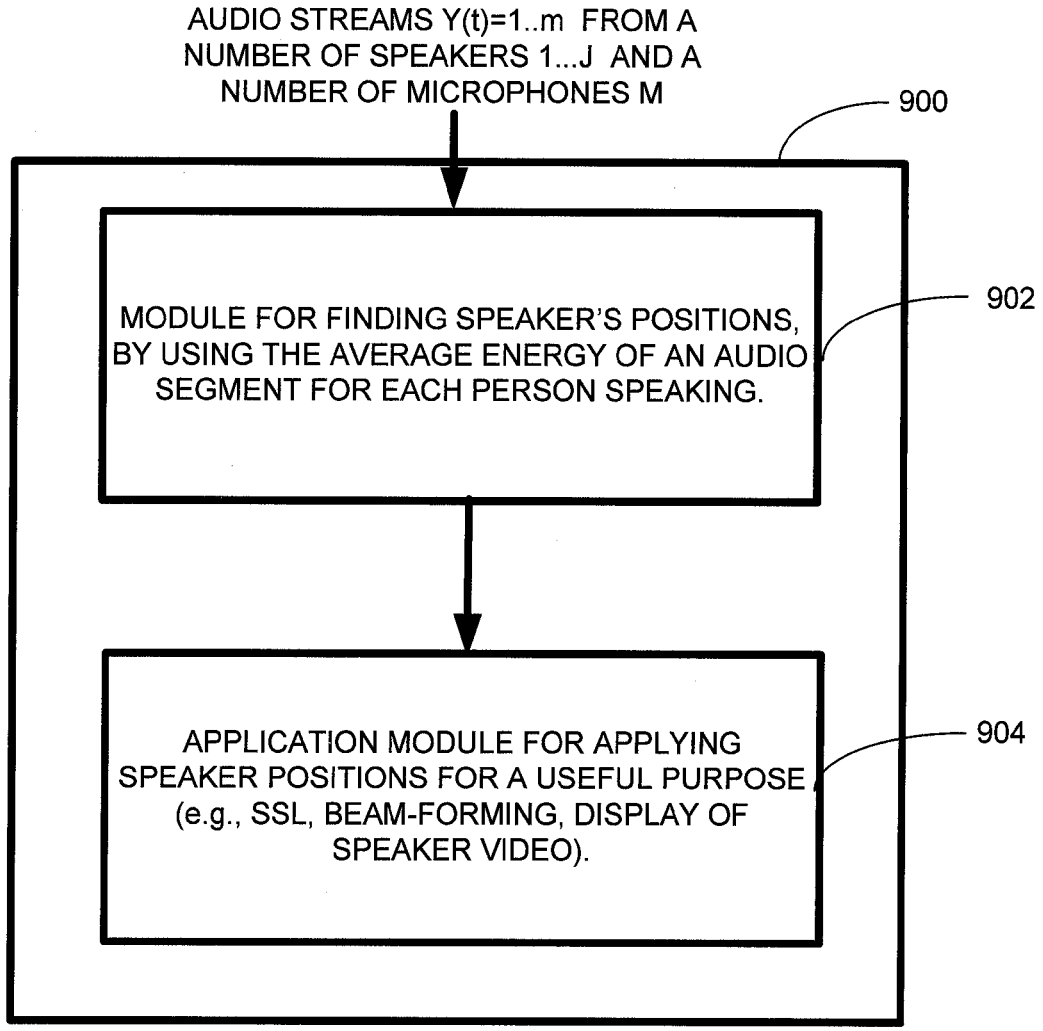
FIG. 9 is a block diagram depicting another embodiment of the architecture of the present energy-based sound source localization and gain normalization technique's architecture wherein the position of any give speaker is computed without assuming that the speakers and the microphones are co-located.

The present energy-based sound source localization and gain normalization technique then can also compute the location of people speaking that do not have their own computing device with a microphone. In one embodiment, shown in FIG. 8, as shown in block 802, this is done by first computing an average energy ratio which is the ratio of the average energy of the audio stream of a speaker that does not have a microphone to a first microphone over the average energy of the audio stream of the speaker that does not have a microphone to a second microphone. This average energy ratio, as shown in block 804, is then used to compute an attenuation ratio, the ratio of the attenuation of the audio stream of the speaker that does not have a microphone to a first microphone over the attenuation of the audio stream of the speaker that does not have a microphone to a second microphone. Once the attenuation ratio is found it is used to find a distance ratio, the ratio of the distance of the speaker that is not closest to a microphone to a first microphone over the distance of the speaker that is not closest to a microphone to a second microphone (block 806). Finally, the distance ratio is used to find the coordinates of the speaker that is not closest to a microphone (block 808).

This situation where there are meeting participants who do not have laptops or another computing device with a microphone, can mathematically be described as follows. Let one assume speaker k has no computing device with a microphone. Note that one cannot apply equation (5) to compute the attenuation of person k's speech when it reaches microphone i, $c_{ik}$, because the average energies $a_{ki}$ and $a_{kk}$ are not available. But for any given two laptops i and j, one can compute the ratio $c_{ik}/c_{jk}$. Given two microphones i and j, in order to estimate speaker k's position, one computes the distance ratio using the attenuation of speaker k's audio to microphone i over speaker k's attenuation to microphones.

From equation (1), one obtains the average energy ratio:

$$\frac{a_{ik}}{a_{jk}} = \frac{m_i s_k c_{ik}}{m_j s_k c_{jk}} = \frac{m_i c_{ik}}{m_j c_{jk}} \quad (6)$$

Thus, one may compute the ratio of the attenuation of person k's speech when it reaches microphone i, $c_{ik}$, to the attenuation of person k's speech when it reaches microphone j, $c_{jk}$, as a function of the average energy ratio and the ratio of the gain of microphones to the gain of microphone i, that is:

$$\frac{c_{ik}}{c_{jk}} = \frac{a_{ik}}{a_{jk}} \frac{m_j}{m_i} \quad (7)$$

Again from equation (1), one obtains $$\frac{a_{ji}}{a_{ii}} = \frac{m_j s_i c_{ji}}{m_i s_i} = \frac{m_j c_{ji}}{m_i} \quad (8)$$

Therefore, the ratio of the gain of microphone j to the gain of microphone i:

$$\frac{m_j}{m_i} = \frac{a_{ji}}{a_{ii}} \frac{1}{c_{ji}} \quad (9)$$

Substituting equation (9) into (7), one obtains $$\frac{c_{ik}}{c_{jk}} = \frac{a_{ik}}{a_{jk}} \frac{a_{ji}}{a_{ii}} \frac{1}{c_{ji}} \quad (10)$$

Notice that $c_{ji}$ can be computed from equation (5). Thus, one is able to compute $c_{ik}/c_{jk}$ by using equation (10). Therefore the distance ratio is obtained by $$\frac{d_{jk}}{d_{ik}} = \frac{a_{ik}}{a_{jk}} \frac{a_{ji}}{a_{ii}} \frac{1}{c_{ji}} \quad (11)$$

Let $P_i$ and $P_j$ denote the coordinates of laptop i and j, respectively. Notice that $P_i$ and $P_j$ can be computed by using the method described in the previous section. Let $P_k$ denote the unknown coordinate of speaker k. Then one obtains $$\frac{\sqrt{|P_k - P_j|^2}}{\sqrt{|P_k - P_i|^2}} = \frac{d_{jk}}{d_{ik}} \quad (12)$$

If there are m laptops. There are $$\binom{m}{2}$$

equations. When $m \geq 3$, one obtains enough equations to solve for the two coordinates of speaker k. The system of equations in (12) can be solved by a nonlinear least square solver.

2.4 Gain Normalization

Equation (9) is a formula to compute the gain ratios between any two microphones. To normalize the gains across the microphones, one only needs to pick one of the microphones, say, microphone 1, as the reference microphone, and multiply the audio signal of the j'th microphone by $$\sqrt{\frac{m_1}{m_j}}.$$

2.5 Alternate Embodiments

Figure 10:
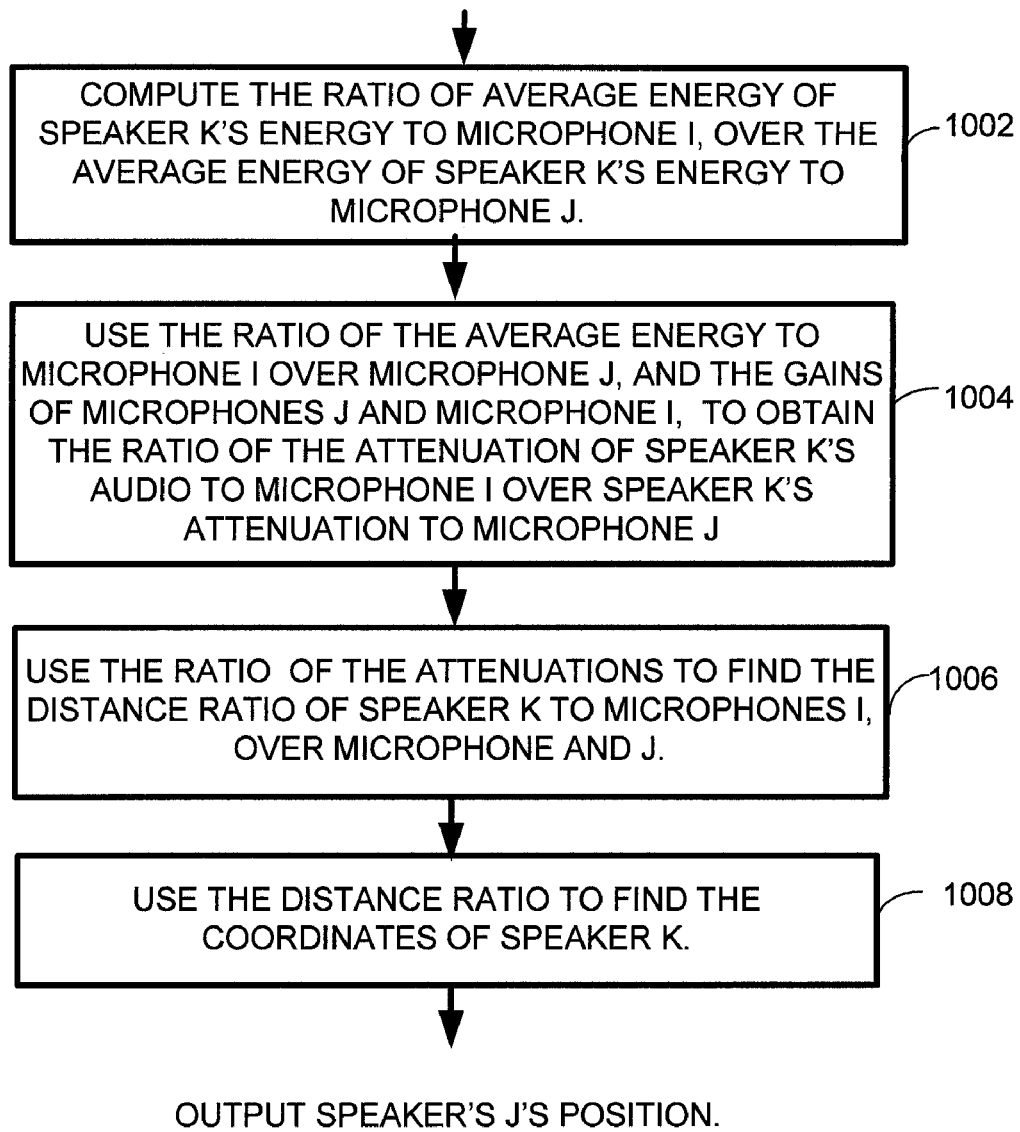
FIG. 10 is a flow diagram depicting one exemplary embodiment of the present sound source localization technique wherein the position of each speaker is computed without assuming that the speakers and microphones are co-located.

It should be noted that numerous other alternate embodiments to the above described energy-based sound source localization and gain normalization procedure are possible. For example, Equation (12) can also be used to estimate the coordinates of a speaker with a laptop or another computing device with a microphone, thus without assuming that the speaker and their microphone are co-located. In this embodiment of the present energy-based sound source localization and gain normalization technique has a first module 902 that computes one or more speakers' positions by using the average energy of an audio segment for each person speaking. The coordinates of one or more speakers can then be used to improve the audio or video of the meeting by an application module 904. More specifically, as shown in FIG. 10, block 1002, this can be done for a given speaker by computing an average energy ratio which is the ratio of the average energy of the audio stream of a speaker to a first microphone over the average energy of the audio stream of the speaker to a second microphone. This average energy ratio, as shown in block 1004, is then used to compute an attenuation ratio, the ratio of the attenuation of the audio stream of the speaker to the first microphone over the attenuation of the audio stream of the speaker to the second microphone. Once the attenuation ratio is found it is used to find a distance ratio, the ratio of the distance of the speaker to the first microphone over the distance of the speaker to the second microphone (block 1006). Finally, the distance ratio is used to find the coordinates of the speaker (block 1008).

Additionally, it is possible to find the position of a person by employing the log domain. For example, by using the following equation in the log domain the location of a speaker can be approximated:

$$\ln a_{ij} = \ln m_i + \ln s_j + \ln \lambda - \ln \sqrt{(u_i - x_j)^2 + (v_i - y_j)^2} + N(0, \sigma_i^2) \quad (13)$$

where $(u_i, v_i)$ are the coordinates of the microphones, $(x_j, y_j)$ are the coordinates of speaker j, $a_{ij}$ is the energy of the audio segment in $y_i(t)$ that corresponds to the jth person's speech, $s_j$ denote the average energy of j th person's original speech, $m_i$ denotes the gain of the microphone i. The term $\ln \lambda$ is a scalar that can be estimated using empirical data and the term $N(0, \sigma_i^2)$ represents the noise of measurements with microphone i. The unknown parameters $\{(u_i,v_i),(x_j,y_j),m_i,s_j\}$ can be estimated by minimizing the following weighted sum of squares:

$$\sum_{i,j} \frac{1}{\sigma_i^2} \left[ \ln(m_i s_j \lambda) - \ln\left(a_{ij} \sqrt{(u_i - x_j)^2 + (v_i - y_j)^2}\right) \right]^2 \quad (14)$$

One of $m_i$'s, e.g., $m_1$, should be set to an arbitrarily positive number, say 1, since one can only obtain microphones' relative gains. The term $\sigma_i^2$ is the variance of the noise measurements with microphone i.

It should also be noted that any or all of the aforementioned embodiments throughout the description may be used in any combination desired to form additional hybrid embodiments.

Wherefore, what is claimed is:

1. A computer-implemented process for determining the location of one or more people speaking in a room captured by an ad hoc microphone network, comprising the process actions of:
    inputting audio streams of people speaking, each audio signal being captured with a microphone on a computing device; and
    segmenting each audio stream to find the person closest to each microphone;
    finding the average energy of the person closest to each microphone;
    using the average energy of the person closest to each microphone, to compute the gain of each microphone;
    using the average energy of the person closest to each microphone, computing the attenuation of each person's speech when it reaches each microphone;
    using the attenuation of each person's speech to find the distance between each microphone; and
    using the distance between each microphone to find the coordinates of each microphone and the person closest to each microphone, assuming that the person closest to each microphone is at the same location as the microphone.

2. The computer-implemented process of claim 1 further comprising using at least one of the coordinates of each microphone and the person closest to each microphone, and the gain of each microphone to improve captured audio or video of the people speaking.

3. The computer-implemented process of claim 1 wherein Metric Multidimensional Scaling is used to obtain the coordinates for each microphone.

4. The computer-implemented process of claim 1 wherein coordinates of the microphone and the person closest to each microphone are used for sound source localization to improve the audio stream of a person speaking.

5. The computer-implemented process of claim 1 wherein coordinates of the microphone and the person closest to each microphone are used for selecting and displaying video of the person closest to each microphone speaking.

6. The computer-implemented process of claim 1 wherein coordinates of the microphone and the person closest to each microphone are used for displaying contact information of the person closest to each microphone when that person is speaking.

7. The computer-implemented process of claim 1 wherein the gain of at least one microphone is used for gain normalization.

8. The computer-implemented process of claim 1, further comprising:
   computing an average energy ratio, the ratio of the average energy of the audio stream of a speaker that does not have a microphone to a first microphone over the average energy of the audio stream of the speaker that does not have a microphone to a second microphone;
   using the average energy ratio to compute an attenuation ratio, the ratio of the attenuation of the audio stream of the speaker that does not have a microphone to a first microphone over the attenuation of the audio stream of the speaker that does not have a microphone to a second microphone;
   using the attenuation ratio to find a distance ratio, the ratio of the distance of the speaker that does not have a microphone to a first microphone over the distance of the speaker that does not have a microphone to a second microphone; and
   using the distance ratio to find the coordinates of the speaker that does not have a microphone.

9. The computer-implemented process of claim 1 wherein segmenting each audio stream to find the person closest to each microphone, comprises:
   recording each person speaking in an audio file;
   segmenting all audio files into segments by detecting the first speech frame and aligning the segments across the audio files; and
   for each segment, finding the audio file that has the highest signal to noise ratio and designating this as the speaker that corresponds to the microphone that captured that audio file.

10. A computer-implemented process for determining and using the location of people speaking in a room captured by an ad hoc microphone network, comprising:
    inputting audio streams of people speaking, each audio signal being captured with a microphone on a computing device; and
    segmenting each audio stream to find the person closest to each microphone;
    finding the average energy of the person closest to each microphone;
    using the average energy of the person closest to each microphone, to compute the gain of each microphone;
    using the average energy of the person closest to each microphone, computing the attenuation of each person's speech when it reaches each microphone;
    using the attenuation of each person's speech that is closest to each microphone to find the distance between each microphone;
    using the distance between each microphone to find the coordinates of each microphone and the person closest to each microphone assuming the microphone and the person closest to it are co-located;
    computing an average energy ratio, the ratio of the average energy of the audio stream of a speaker that does not have a microphone to a first microphone over the average energy of the audio stream of the speaker that does not have a microphone to a second microphone;
    using the average energy ratio to compute an attenuation ratio, the ratio of the attenuation of the audio stream of the speaker that does not have a microphone to a first microphone over the attenuation of the audio stream of the speaker that does not have a microphone to a second microphone;
    using the attenuation ratio to find a distance ratio, the ratio of the distance of the speaker that does not have a microphone to a first microphone over the attenuation of the distance of the speaker that does not have a microphone to a second microphone; and
    using the distance ratio to find the coordinates of the speaker that does not have a microphone.

11. The computer-implemented process of claim 10 further comprising using at least one of the coordinates of each microphone and the person closest to each microphone, the coordinates of a person that does not have a microphone, and the gain of each microphone to improve captured audio or video of the people speaking.

12. The computer-implemented process of claim 10 wherein the gain of at least two microphones is used to perform gain normalization.

13. The computer-implemented process of claim 10 wherein using the distance ratio to find the coordinates of the speaker that does not have a microphone is solved by a non-linear least square solver.

14. A computer-readable medium having computer-executable instructions for performing the process recited in claim 10.

15. A system for improving the audio and video quality of a recorded event, comprising:
    a general purpose computing device;
    a computer program comprising program modules executable by the general purpose computing device, wherein the computing device is directed by the program modules of the computer program to,
    find one or more speakers' positions by using the average energy of a captured audio segment for each person speaking; and
    apply the one or more speakers' positions to improve the audio or video of a captured event.

16. The system of claim 15 wherein the module to find the one or more speakers' positions comprises sub-modules to:
    compute an average energy ratio, the ratio of the average energy of the audio stream of a speaker to a first microphone over the average energy of the audio stream of the speaker to a second microphone;

use the average energy ratio to compute an attenuation ratio, the ratio of the attenuation of the audio stream of the speaker to a first microphone over the attenuation of the audio stream of the speaker to a second microphone;

use the attenuation ratio to find a distance ratio, the ratio of the distance of the speaker to a first microphone over the distance of the speaker to a second microphone; and use the distance ratio to find the coordinates of the speaker.

17. The system of claim 15 further comprising program modules to, find one or more speakers' positions, microphone positions, and gain of the microphones where each person speaking has a computing device with a microphone by using the average energy of a captured audio segment for each person speaking; and, apply at least one of the speakers' positions, microphone positions, and the gain of the microphones to improve the audio or video of a captured event.

18. The system of claim 17 wherein the module to find the one or more speakers' positions, microphone positions, and gain of the microphones where each person speaking has a computing device with a microphone comprises sub-modules to:

segment received audio streams from each person in a room that speaks to find the average energy of an audio segment for each of the people speaking;

compute the attenuation of a person's speech when it reaches each of the microphones and the gain of each of the microphones;

use the attenuations to find the distance between each microphone relative to the other microphones; and use the distances between each microphone relative to the other microphones to find the coordinates of each microphone and each person speaking, assuming the microphones and the people speaking are co-located.

19. The system of claim 17 wherein the module to apply the speakers' positions, microphone positions and microphone gains to improve the audio or video of a captured event performs gain normalization to create a single audio stream of the captured event.

20. The system of claim 15 wherein the module to find the one or more speakers' positions comprises sub-modules to:

express the average energy of speaker j, $a_{ij}$, in an audio segment in an audio file $y_i(t)$ in the log domain using the coordinates of microphones used to capture the audio segment $(u_i,v_i)$, the coordinates of the speaker j $(x_j,y_j)$, the average energy of j's original speech, $s_j$, the gain of a microphone i, $m_i$, and the noise measurements of microphone i, $N(0,\sigma_i^2)$; and minimize a sum of error functions weighted by the variance of the noise measurements of each microphone to find one or more speakers' positions.

* * * * *